US012660897B2

(12) United States Patent
Crosby et al.

(10) Patent No.: US 12,660,897 B2
(45) Date of Patent: Jun. 23, 2026

(54) ERGONOMIC HANDLE FOR A PROBING CANE

(71) Applicant: Smart Guider Inc., San Diego, CA (US)

(72) Inventors: Kelvin Crosby, San Diego, CA (US); Angela Ulloa, Independence, KY (US)

(73) Assignee: Smart Guider Inc., San Diego, CA (US)

(*) Notice: Subject to any disclaimer, the term of this patent is extended or adjusted under 35 U.S.C. 154(b) by 337 days.

(21) Appl. No.: 18/442,268

(22) Filed: Feb. 16, 2024

(65) Prior Publication Data

US 2024/0277555 A1 Aug. 22, 2024

Related U.S. Application Data

(60) Provisional application No. 63/485,745, filed on Feb. 17, 2023.

(51) Int. Cl.
*A45B 9/02* (2006.01)
*A61H 3/06* (2006.01)

(52) U.S. Cl.
CPC ............... *A45B 9/02* (2013.01); *A61H 3/061* (2013.01); *A61H 3/068* (2013.01); *A61H 2201/1635* (2013.01); *A61H 2205/065* (2013.01)

(58) Field of Classification Search
CPC .. A45B 9/02; A46B 5/02; A46B 5/021; A46B 5/025; A61H 3/068; A61H 3/061; A61H 2201/1635; A61H 2205/065
USPC ...... 135/25.4, 65, 76; 16/422, 430, DIG. 12; D8/DIG. 6, DIG. 7; D26/37, 48, 50; 362/102, 118
See application file for complete search history.

(56) References Cited

U.S. PATENT DOCUMENTS

| | | | | | |
|---|---|---|---|---|---|
| 835,709 | A * | 11/1906 | Miller | A46B 5/02 | 15/167.1 |
| 1,131,863 | A * | 3/1915 | Phillips | A46B 7/04 | 279/23.1 |
| 1,512,920 | A * | 10/1924 | Galvin | B25G 3/00 | 81/177.1 |
| 1,648,616 | A * | 11/1927 | Martin | E04G 21/16 | 16/422 |
| 1,657,450 | A * | 1/1928 | Barnes | A46B 9/04 | 132/308 |
| 1,826,165 | A * | 10/1931 | Cartwright | A46B 5/02 | 15/143.1 |
| 3,302,566 | A * | 2/1967 | Blanchet | B41K 1/363 | 403/404 |
| D216,247 | S * | 12/1969 | McGuire | D4/135 | |
| 3,893,364 | A * | 7/1975 | Harrison | G10D 13/12 | 984/150 |
| D321,365 | S * | 11/1991 | Bostick | D18/15 | |
| 5,511,445 | A * | 4/1996 | Hildebrandt | B25G 1/01 | 81/177.1 |

(Continued)

*Primary Examiner* — Robert Canfield
(74) *Attorney, Agent, or Firm* — Synergy Patent Group LLC

(57) ABSTRACT

Various aspects of the disclosure generally relate to a handle with enhanced ergonomics and improved shape, especially for use with a probing or mobility cane. In one aspect, the handle may offer improved grip and coordination by someone who is blind or sight impaired. In one aspect, the handle may contain electronics and offer improved usability in the operation of those electronics.

17 Claims, 17 Drawing Sheets

(56) References Cited

U.S. PATENT DOCUMENTS

| | | | | | |
|---|---|---|---|---|---|
| 6,052,868 | A * | 4/2000 | Chen | A45C 13/26<br>135/25.4 |
| D584,119 | S * | 1/2009 | Manzanares | D8/45 |
| 8,032,991 | B2 * | 10/2011 | Lawless | B25G 1/105<br>81/489 |
| D676,993 | S * | 2/2013 | Kotsis | D26/46 |
| 8,850,662 | B2 * | 10/2014 | Gitman | A61B 17/3213<br>16/430 |
| D756,662 | S * | 5/2016 | Lambertson, Jr | D4/138 |
| 10,046,213 | B2 * | 8/2018 | Goldfader | A63B 53/007 |
| 10,631,600 | B2 * | 4/2020 | Moyo | A45B 3/02 |
| D931,622 | S * | 9/2021 | Bettanin | D4/138 |
| D968,665 | S * | 11/2022 | Rubin | D26/37 |
| 11,497,673 | B2 * | 11/2022 | Ceylan | A61H 3/061 |
| 11,723,452 | B2 * | 8/2023 | Alvarez | A46B 17/02<br>15/143.1 |
| 12,064,027 | B2 * | 8/2024 | Ross | A46B 7/04 |
| D1,088,566 | S * | 8/2025 | Copen | D4/138 |
| 2008/0251109 | A1 * | 10/2008 | Lee | A45B 3/04<br>135/66 |
| 2009/0183607 | A1 * | 7/2009 | Johnson | B25H 3/003<br>206/349 |
| 2010/0043853 | A1 * | 2/2010 | Wu | A45B 3/04<br>135/66 |
| 2014/0075693 | A1 * | 3/2014 | Maslow | A46B 5/02<br>15/246 |
| 2018/0147463 | A1 * | 5/2018 | Breeden, III | A63B 53/14 |
| 2019/0009151 | A1 * | 1/2019 | Breeden, III | B25G 3/18 |
| 2021/0128394 | A1 * | 5/2021 | Roman | A61H 3/061 |
| 2022/0279903 | A1 * | 9/2022 | Lisenby | A45B 9/02 |
| 2022/0408908 | A1 * | 12/2022 | Scott, Sr | A46B 5/02 |

* cited by examiner

ERGONOMIC HANDLE FOR A PROBING CANE

CROSS-REFERENCE TO RELATED APPLICATIONS

This application claims priority under 35 U.S.C. § 119 to U.S. Provisional Patent Application No. 63/485,745, filed Feb. 17, 2023, entitled Handle Design for a Blind Cane, which is hereby incorporated by reference in its entirety.

BACKGROUND

Field of the Disclosure

Aspects of the disclosure relate to ergonomics of a handle, for example as used with a mobility cane.

Description of Related Art

Handles for mobility canes are typically round, straight shafts with a ball at the end, of various sizes. Modern canes necessitate a change in handle shape and what is needed is an ergonomic handle for a probing cane.

SUMMARY

This disclosure recites a handle with a shaft having a proximal end and a distal end. The proximal end may be configured for connecting. A first side of the shaft may be flat and a second side of the shaft may be curved. The first and second sides may extend from the proximal end to the distal end. The shaft may have a bulge at the distal end extending from the distal end to the proximal end no more than one-third of the length of the shaft. The bulge may share the first side and the second side of the shaft. A third side of the shaft may be flat. The third side of the shaft may be parallel to the first side. The third side may be connected by the first and second sides. The third side may extend from the proximal end of the shaft to the distal end. The third side of the shaft may be narrower than the first side of the shaft. The third side of the shaft may have a width no greater than 70% the width of the first side. The width of the first side of the shaft may be greater in the bulge than toward the proximal end of the shaft. The second, curved side of the shaft may extend around the entire circumference of the shaft except at the first, flat side of the shaft. The width of the first side of the shaft may be greater in the bulge than toward the proximal end of the shaft. The shaft may have a constant diameter from the proximal end to the distal end. The diameter may be measured from the first side along a line perpendicular to the first side. The handle may include electronics located within the shaft, a charge port at the proximal end of the shaft and connected to the electronics, a power switch connected to the electronics and suitable for activating and deactivating the electronics. A probing cane may be coupled to the shaft at the proximal end of the shaft.

In one aspect, the width of the first side of the shaft may be greater in the bulge than toward the proximal end of the shaft. The width of the third side of the shaft may be greater in the bulge than toward the proximal end of the shaft. The shaft may have a constant diameter from the proximal end to the distal end, the diameter being measured from the first side along a line perpendicular to the first side. The handle may include electronics located within the shaft, a charge port at the proximal end of the shaft and connected to the electronics, and a power switch connected to the electronics and suitable for activating and deactivating the electronics. A probing cane may be coupled to the shaft at the proximal end of the shaft.

In one aspect a handle with a shaft may have a proximal end and a distal end. The proximal end may be configured for connecting. A first side of the shaft may be flat. A second side of the shaft may be flat and parallel to the first side. A third side of the shaft may be curved and connect together the first side and the second sides. The first, second and third sides may extend from the proximal end to the distal end. The first side of the shaft may be narrower than the second side. There may be a fourth side of the shaft which may be curved. The fourth side may connect together the first side and the second side. The fourth side may be opposite the third side. The fourth side may extend from the proximal end to the distal end. The shaft may have a constant diameter from the proximal end to the distal end. The diameter may be measured from the first side, along a line perpendicular to the first side. There may be electronics located within the shaft, a charge port at the proximal end of the shaft and connected to the electronics, and a power switch connected to the electronics and suitable for activating and deactivating the electronics. A probing cane may be coupled to the shaft at the proximal end.

The foregoing has outlined rather broadly the gestures and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of this disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully herein with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure may be embodied by one or more elements of a claim.

A handle according to this description may be used with (or a handle may be attached to) a variety of canes, for example mobility canes. Mobility canes may be used by vision-impaired or blind people to assist in navigation. Mobility canes may be made from aluminum, graphite-reinforced plastic or other fiber-reinforced plastic, and can come with a wide variety of tips depending on the user's preference. They may be collapsible or fixed. One example of a mobility cane is a probing cane (commonly called a "white cane" or a "long cane"), which may be used to probe for and locate obstacles in a path of travel. Some examples of a cane are found in U.S. Pat. No. 11,185,461, filed May 21, 2020 entitled SYSTEM AND APPARATUS FOR MOBILITY CANE FOR THE VISUALLY IMPAIRED and hereby incorporated by reference in its entirety. "Cane" or "probing cane" as used herein includes every type, manner and configuration of cane as described in U.S. Pat. No. 11,185,461.

Figure 1:
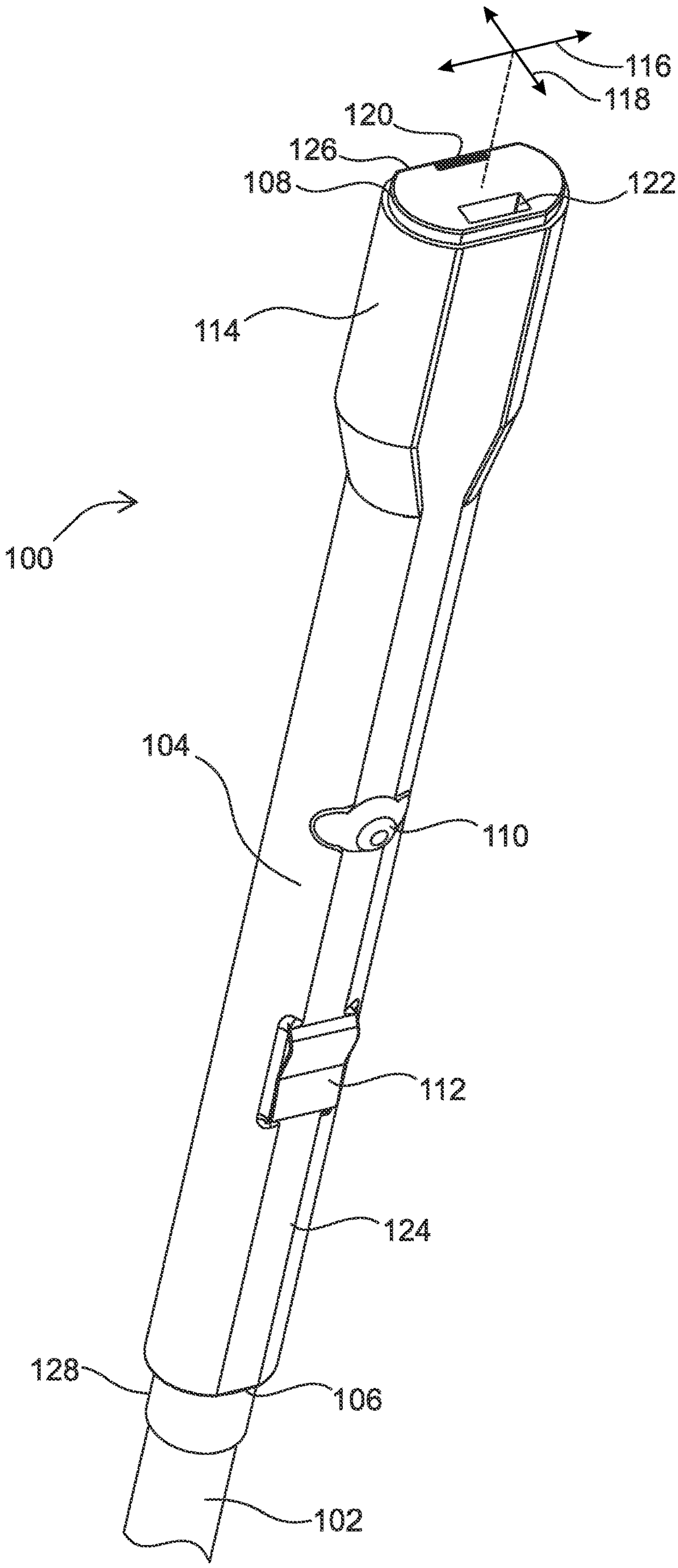
FIG. 1 is a perspective view of one handle attached to a cane.

FIG. 1 is a perspective view of handle 100 attached to cane 102. Cane 102 may be removably or permanently connected to handle 100. Cane 102 may be any type of mobility cane, collapsible or fixed, probing cane, and may include illumination (either external or internal), notification technologies to make others aware of a user, or other electronics.

Handle 100 may have shaft 104 with end 106 proximal to cane 102 and end 108 distal to cane 102. In one aspect, handle 100 may contain electrical equipment (not illustrated), for example electronics, a battery, microcontroller etc. for powering a light source within cane 102 or connection, location or tracking features, wired and wireless communication. In one aspect button 110 may be a push button or an on/off switch. In one aspect, button 112 may be rocker switch, mode selector, or other type of actuation and may provide feedback to a user such as vibration or sound. Buttons 110 and 112 may be reversed in function or operation.

In one aspect, handle 100 may include bulge 114. Bulge 114 may extend from end 108 towards end 106, along shaft 104, from 10% of the length of shaft 104 to 40%, or from 10% to 35%, or from 15% to 33%, or from 10% to 30%, or from 15% to 25%, or approximately 20%, or no more than one third, or no more than one quarter, or no more than one fifth. Bulge 114 may be an increase in the diameter of shaft 104 along a single axis without increasing the diameter along a perpendicular axis (illustrated in FIG. 1). In one aspect, bulge 114 is an increase in shaft diameter along axis 116 without increasing shaft diameter along axis 118.

Bulge 114 may be an increase in the diameter of shaft 104 along multiple axes (not illustrated). Bulge 114 provides a positive surface along which a palm (not illustrated) can rest and gain increased control over handle 100 as well as assisting a user with knowing and maintaining an orientation of handle 100 in the user's hand.

In one aspect, end 108 may include slot 120 into which a lanyard, rope, string, or other retention device (none illustrated) may be inserted or secured. Port 122 may provide an interface to electrical equipment in handle 100 for wired communication, charging, or both.

In one aspect, handle 100 includes flat side 124. Flat side 124 may extend from proximal end 106 to distal end 108 and be parallel and opposite to flat side 126, only the end of which is visible in FIG. 1. Flat sides 124 and 126 may be the same in width or their widths may differ. Flat side 124 may be wider or narrower than flat side 126. In one aspect, flat side 124 has a width no greater than 70% the width of flat side 126. In one aspect, flat side 124 has a width no greater than 75% the width of flat side 126. In one aspect, flat side 124 has a width no greater than 80% the width of flat side 126. In one aspect, flat side 124 has a width no greater than 85% the width of flat side 126. In one aspect, flat side 124 has a width no greater than 90% the width of flat side 126. In one aspect, flat side 124 has a width no greater than 95% the width of flat side 126.

Cover 128 may wrap the entirety of handle 100 and extend beyond shaft 104 by approximately 4-5 mm, covering handle 100 and a portion of cane 102. Cover 128 may be made from a neoprene, rubber, silicon, tape or other protective material.

In one aspect, handle 100 may have a length of approximately 126 mm, a width across axis 118 of approximately 25 mm, a width across axis 116 for shaft 104 of approximately 29 mm, a width across axis 116 for bulge 114 of approximately 39 mm. Bulge 114 may represent a 34% increase over shaft diameter, or between 32% and 36%, or between 30% and 38% along at least one axis. Flat side 124 may have a width of 10 mm along shaft 104. Flat side 124 may have a width of 13 mm along bulge 114.

Figure 2:
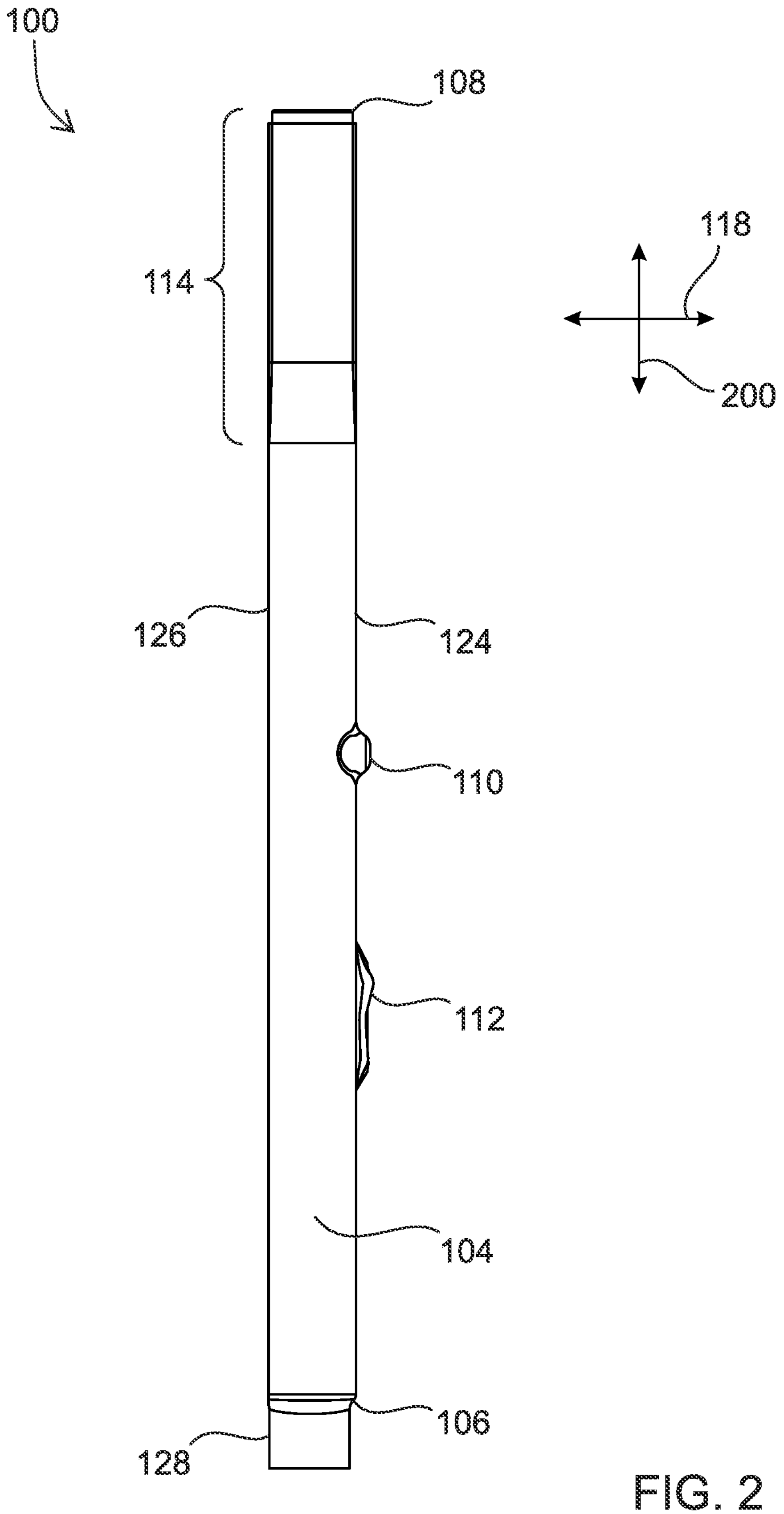
FIG. 2 is a side plan view of the handle from FIG. 1.

FIG. 2 is a side plan view of the handle from FIG. 1. Handle 100 as illustrated in FIG. 2 is presented along a view of handle 100 from FIG. 1, along axis 116, such that axis 116 of FIG. 1 would be perpendicular to a sheet illustrating FIG. 2.

FIG. 2 illustrates shaft 104 with end 106 proximal to cane 102 (not illustrated in FIG. 2) and end 108 distal to cane 102. Buttons 110 and 112 may be positioned on flat side 124. Flat side 124 may be parallel and opposite to flat side 126.

Bulge 114 as illustrated in FIG. 2 may have the same width as shaft 104, across axis 118. In one aspect, bulge 114 is an increase in shaft diameter along axis 116 without increasing shaft diameter along axis 118. Along axis 200, handle 100 may have a length of approximately 126 mm.

Cover 128 may wrap the entirety of handle 100 and extend beyond shaft 104 by approximately 5 mm, covering handle 100 and a portion of cane 102.

Figure 3:
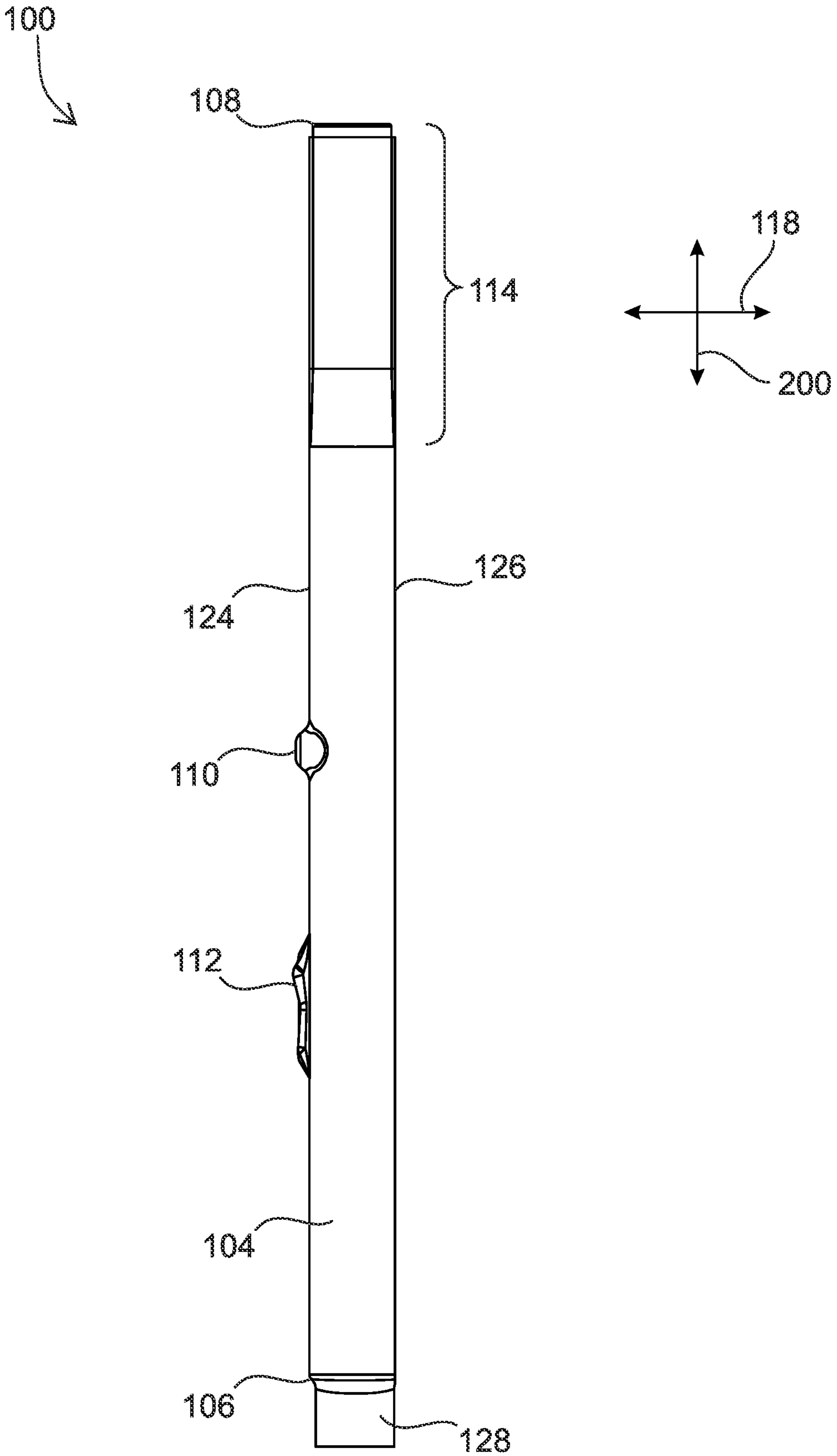
FIG. 3 is a side plan view of the handle from FIG. 1.

FIG. 3 is a side plan view of the handle from FIG. 1. Handle 100 as illustrated in FIG. 3 is presented along a view of handle 100 from FIG. 1, along axis 116, such that axis 116 of FIG. 1 would be perpendicular to a sheet illustrating FIG. 3. FIG. 3 illustrated handle 100 from the opposite side of handle 100 as illustrated in FIG. 2.

FIG. 3 illustrates shaft 104 with end 106 proximal to cane 102 (not illustrated in FIG. 3) and end 108 distal to cane 102. Buttons 110 and 112 may be positioned on flat side 124. Flat side 124 may be parallel and opposite to flat side 126.

Bulge 114 as illustrated in FIG. 3 may have the same width as shaft 104, across axis 118. In one aspect, bulge 114 is an increase in shaft diameter along axis 116 without increasing shaft diameter along axis 118. Along axis 200, handle 100 may have a length of approximately 126 mm.

Cover 128 may wrap the entirety of handle 100 and extend beyond shaft 104 by approximately 5 mm, covering handle 100 and a portion of cane 102.

Figure 4:
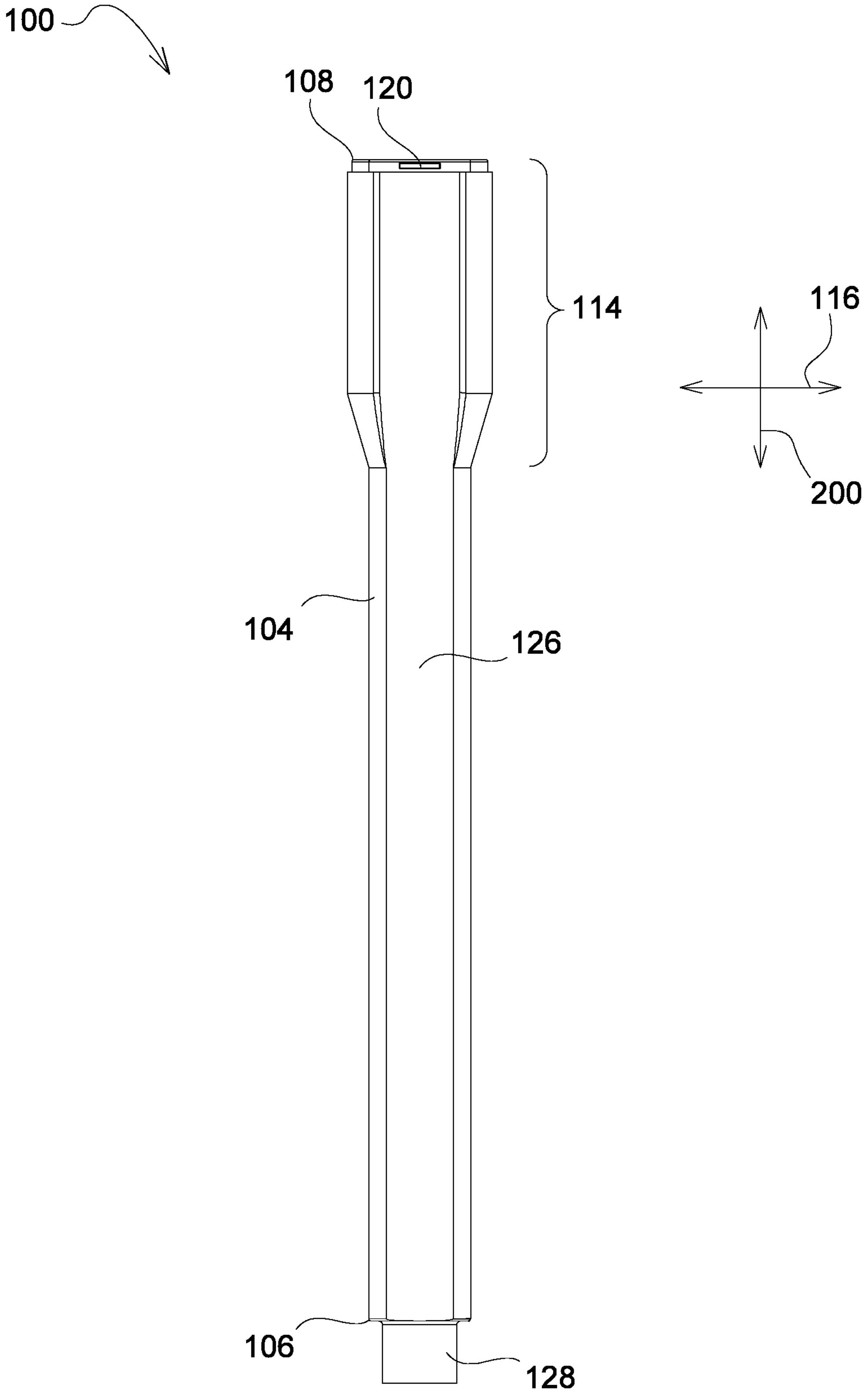
FIG. 4 is a bottom plan view of the handle from FIG. 1.

FIG. 4 is a bottom plan view of the handle from FIG. 1. Handle 100 as illustrated in FIG. 4 is presented along a view of handle 100 from FIG. 1, along axis 118, such that axis 118 of FIG. 1 would be perpendicular to a sheet illustrating FIG. 4.

FIG. 4 illustrates shaft 104 with end 106 proximal to cane 102 (not illustrated in FIG. 4) and end 108 distal to cane 102. Flat side 126 may be parallel and opposite to flat side 124 (not illustrated in FIG. 4).

Bulge 114 as illustrated in FIG. 4 may be wider than shaft 104, across axis 116. In one aspect, bulge 114 is an increase in shaft diameter along axis 116 without increasing shaft diameter along axis 118 (not illustrated in FIG. 4). Along axis 200, handle 100 may have a length of approximately 126 mm. Flat side 126 may have a width along axis 116 of approximately 17 mm for shaft 104. Flat side 126 may have a width along axis 116 of approximately 21 mm for a portion of bulge 114, with a taper between the two widths along a portion of bulge 114. Shaft 104 may have a diameter along axis 116 of 28 mm.

Cover 128 may wrap the entirety of handle 100 and extend beyond shaft 104 by approximately 5 mm, covering handle 100 and a portion of cane 102. Slot 120 may be at distal end 108.

Figure 5:
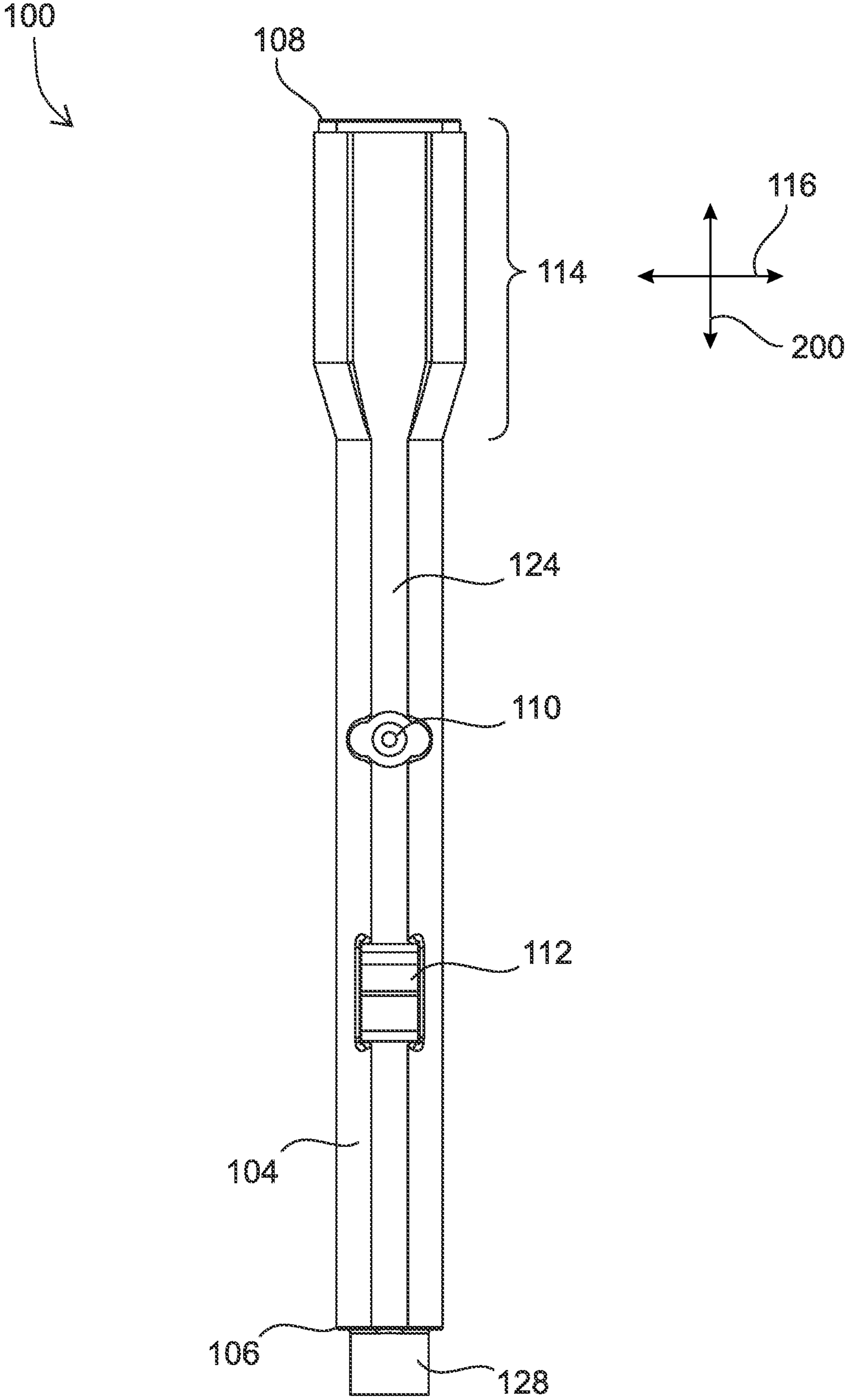
FIG. 5 is a top plan view of the handle from FIG. 1.

FIG. 5 is a top plan view of the handle from FIG. 1. Handle 100 as illustrated in FIG. 5 is presented along a view of handle 100 from FIG. 1, along axis 118, such that axis 118 of FIG. 1 would be perpendicular to a sheet illustrating FIG. 5.

FIG. 5 illustrates shaft 104 with end 106 proximal to cane 102 (not illustrated in FIG. 5) and end 108 distal to cane 102. Flat side 124 may be parallel and opposite to flat side 126 (not illustrated in FIG. 5).

Bulge 114 as illustrated in FIG. 5 may be wider than shaft 104, across axis 116. In one aspect, bulge 114 is an increase in shaft diameter along axis 116 without increasing shaft diameter along axis 118 (not illustrated in FIG. 5). Along axis 200, handle 100 may have a length of approximately 126 mm. Flat side 124 may have a width along axis 116 of approximately 10 mm for shaft 104. Flat side 124 may have a width along axis 116 of approximately 13 mm for a portion of bulge 114, with a taper between the two widths along a portion of bulge 114.

Cover 128 may wrap the entirety of handle 100 and extend beyond shaft 104 by approximately 5 mm, covering handle 100 and a portion of cane 102. Buttons 110 and 112 are illustrated in FIG. 5.

Figure 6:
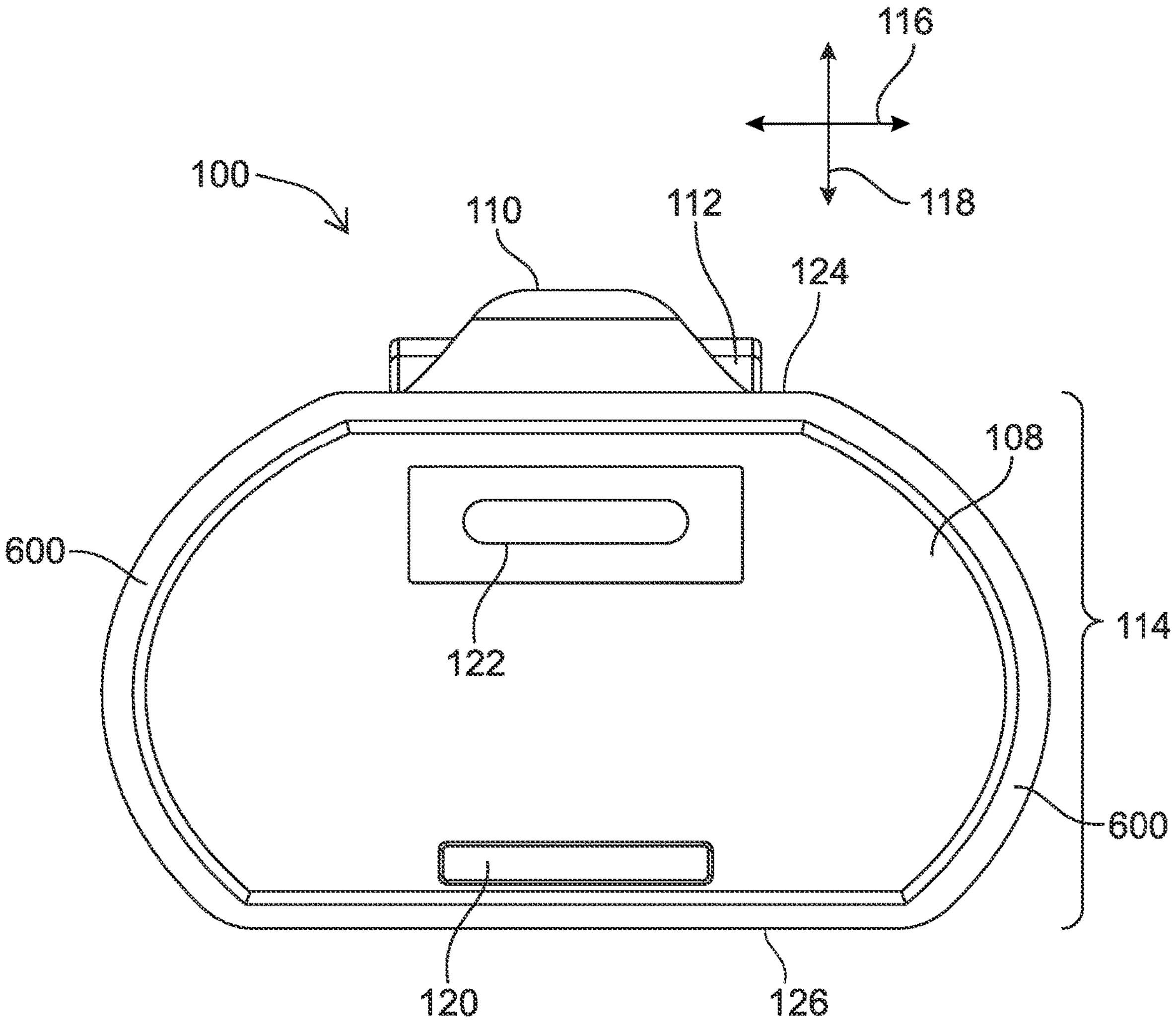
FIG. 6 is a distal plan view of the handle from FIG. 1.

FIG. 6 is a distal plan view of the handle from FIG. 1. Handle 100 as illustrated in FIG. 6 is presented along a view of handle 100 from FIGS. 2-5, along axis 200, such that axis 200 of FIGS. 2-5 would be perpendicular to a sheet illustrating FIG. 6.

FIG. 6 illustrates end 108 distal to cane 102 (not illustrated in FIG. 6) with end 106 proximal (not illustrated in FIG. 6) to cane 102. Flat side 124 may be parallel and opposite to flat side 126. Curved sides 600 may connect flat sides 124 and 126. Curved sides 600 may be circular, elliptical, or otherwise shaped curves.

Bulge 114 as illustrated in FIG. 6 may be wider than shaft 104 (not illustrated in FIG. 6), across axis 116. In one aspect, bulge 114 is an increase in shaft diameter along axis 116 without increasing shaft diameter along axis 118. Flat side 124 may have a width along axis 116 of approximately 13 mm for a portion of bulge 114. Flat side 126 may have a width along axis 116 of approximately 21 mm for a portion of bulge 114.

Slot 120, port 122 and button 110 are illustrated in FIG. 6.

Figure 7:
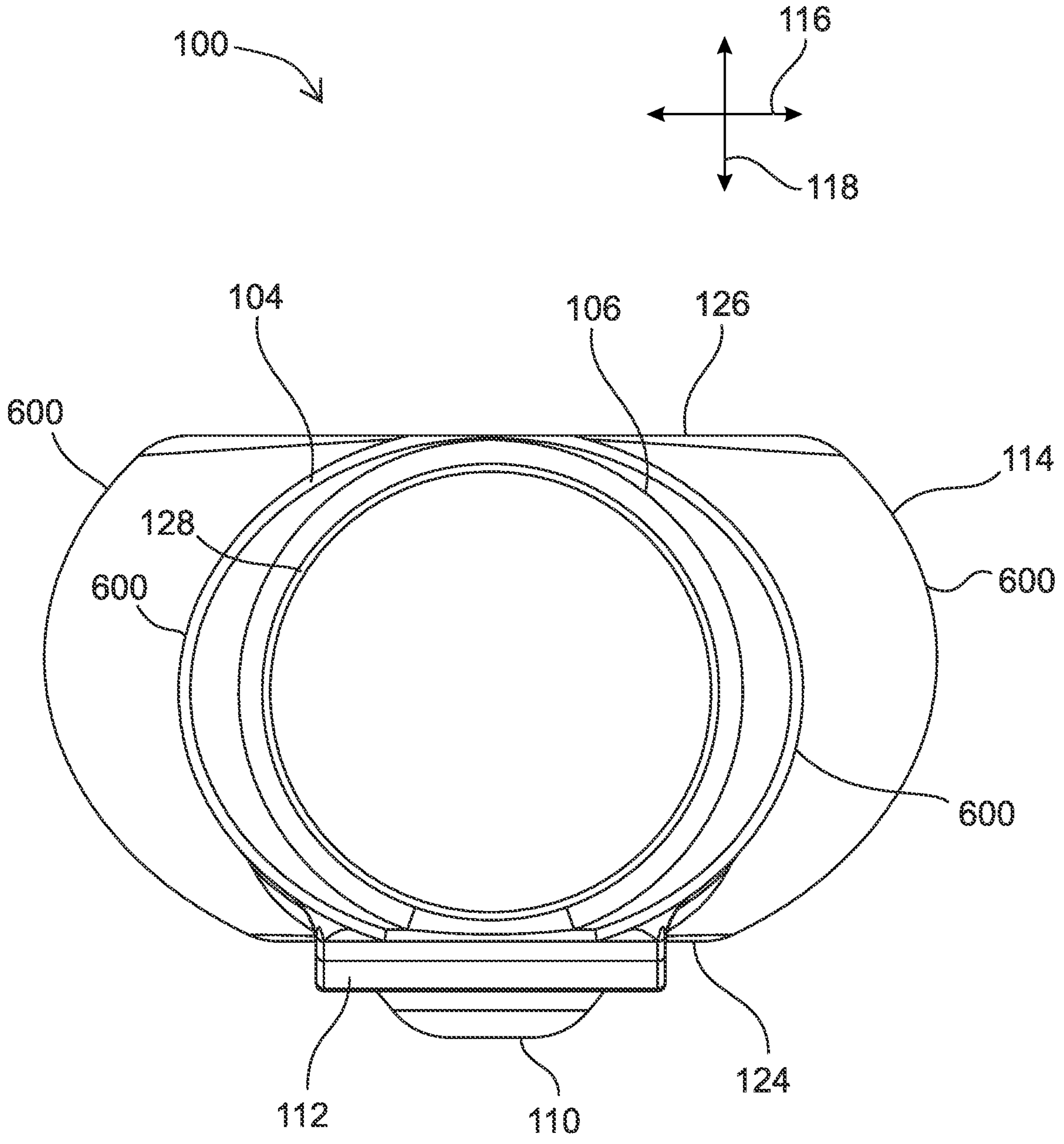
FIG. 7 is a proximal plan view of the handle from FIG. 1.

FIG. 7 is a proximal plan view of the handle from FIG. 1. Handle 100 as illustrated in FIG. 7 is presented along a view of handle 100 from FIGS. 2-5, along axis 200, such that axis 200 of FIGS. 2-5 would be perpendicular to a sheet illustrating FIG. 7.

FIG. 7 illustrates end 106 proximal to cane 102 (not illustrated in FIG. 7) with end 108 distal (not illustrated in FIG. 7) to cane 102. Flat side 124 may be parallel and opposite to flat side 126. Curved sides 600 may connect flat sides 124 and 126. Curved sides 600 may be circular, elliptical, or otherwise shaped curves.

Bulge 114 as illustrated in FIG. 7 may be wider than shaft 104 across axis 116. In one aspect, bulge 114 is an increase in shaft diameter along axis 116 without increasing shaft diameter along axis 118. Buttons 110 and 112, and cover 128 are illustrated in FIG. 7.

Figure 8:
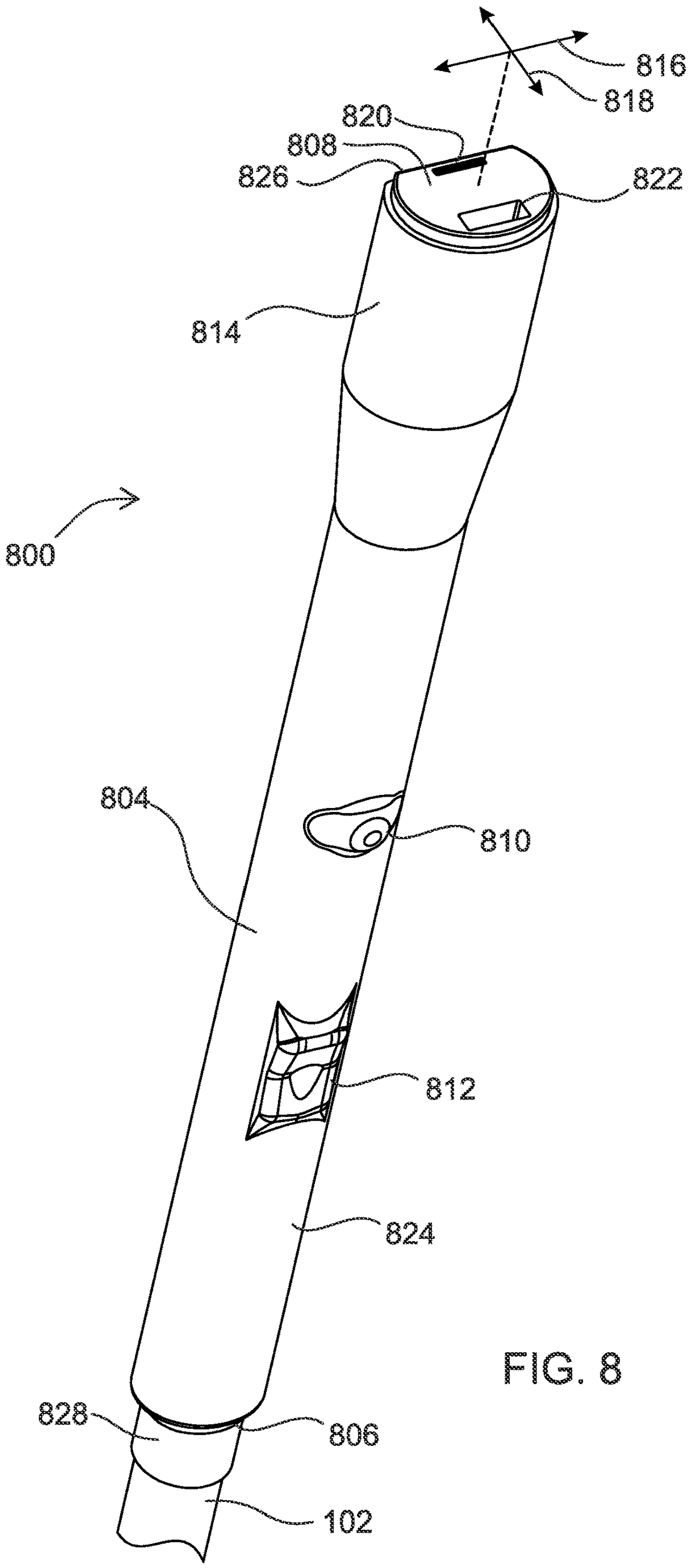
FIG. 8 is a perspective view of one handle attached to a cane.

FIG. 8 is a perspective view of one handle attached to a cane. FIG. 8 is a perspective view of handle 800 attached to cane 102. Handle 800 may differ from handle 100 at least as much as having a single flat side on handle 800, as compared to two flat sides on handle 100. FIGS. 8-11 illustrate this difference. Views, aspects and dimensions of handle 800 not illustrated in the Figures or separately described may be similar or identical to those views, aspects and dimensions for handle 100 previously discussed.

Cane 102 may be removably or permanently connected to handle 800. Cane 102 may be any type of mobility cane, collapsible or fixed, probing cane, and may include illumination (either external or internal), notification technologies to make others aware of a user, or other electronics.

Handle 800 may have shaft 804 with end 806 proximal to cane 102 and end 808 distal to cane 102. In one aspect, handle 800 may contain electrical equipment (not illustrated), for example electronics, a battery, microcontroller etc. for powering a light source within cane 102 or connection, location or tracking features, wired and wireless communication. In one aspect button 810 may be a push button or an on/off switch. In one aspect, button 812 may be rocker switch, mode selector, or other type of actuation and may provide feedback to a user such as vibration or sound. Buttons 810 and 812 may be reversed in function or operation.

In one aspect, handle 800 may include bulge 814. Bulge 814 may extend from end 808 towards end 806, along shaft 804, from 10% of the length of shaft 804 to 40%, or from 10% to 35%, or from 15% to 33%, or from 10% to 30%, or from 15% to 25%, or approximately 20%, or no more than one third, or no more than one quarter, or no more than one fifth. Bulge 814 may be an increase in the diameter of shaft 804 along a single axis without increasing the diameter along a perpendicular axis (illustrated in FIG. 1). In one aspect, bulge 814 is an increase in shaft diameter along axis 816 without increasing shaft diameter along axis 818.

Bulge 814 may be an increase in the diameter of shaft 804 along multiple axes (not illustrated). Bulge 814 provides a positive surface along which a palm (not illustrated) can rest and gain increased control over handle 800 as well as assisting a user with knowing and maintaining an orientation of handle 800 in the user's hand.

In one aspect, end 808 may include slot 820 into which a lanyard, rope, string, or other retention device (none illustrated) may be inserted or secured. Port 822 may provide an interface to electrical equipment in handle 800 for wired communication, charging, or both.

In one aspect, handle 800 includes flat side 826. Flat side 826 may extend from proximal end 806 to distal end 808. Cover 828 may wrap the entirety of handle 800 and extend beyond shaft 804 by approximately 4-5 mm, covering handle 800 and a portion of cane 102. Cover 828 may be made from a neoprene, rubber, silicon, tape or other protective material.

In one aspect, handle 800 may have a length of approximately 126 mm, a width across axis 818 of approximately 25 mm, a width across axis 816 for shaft 804 of approximately 29 mm, a width across axis 816 for bulge 814 of approximately 39 mm. Bulge 814 may represent a 34% increase over shaft diameter, or between 32% and 36%, or between 30% and 38% along at least one axis.

Figure 9:
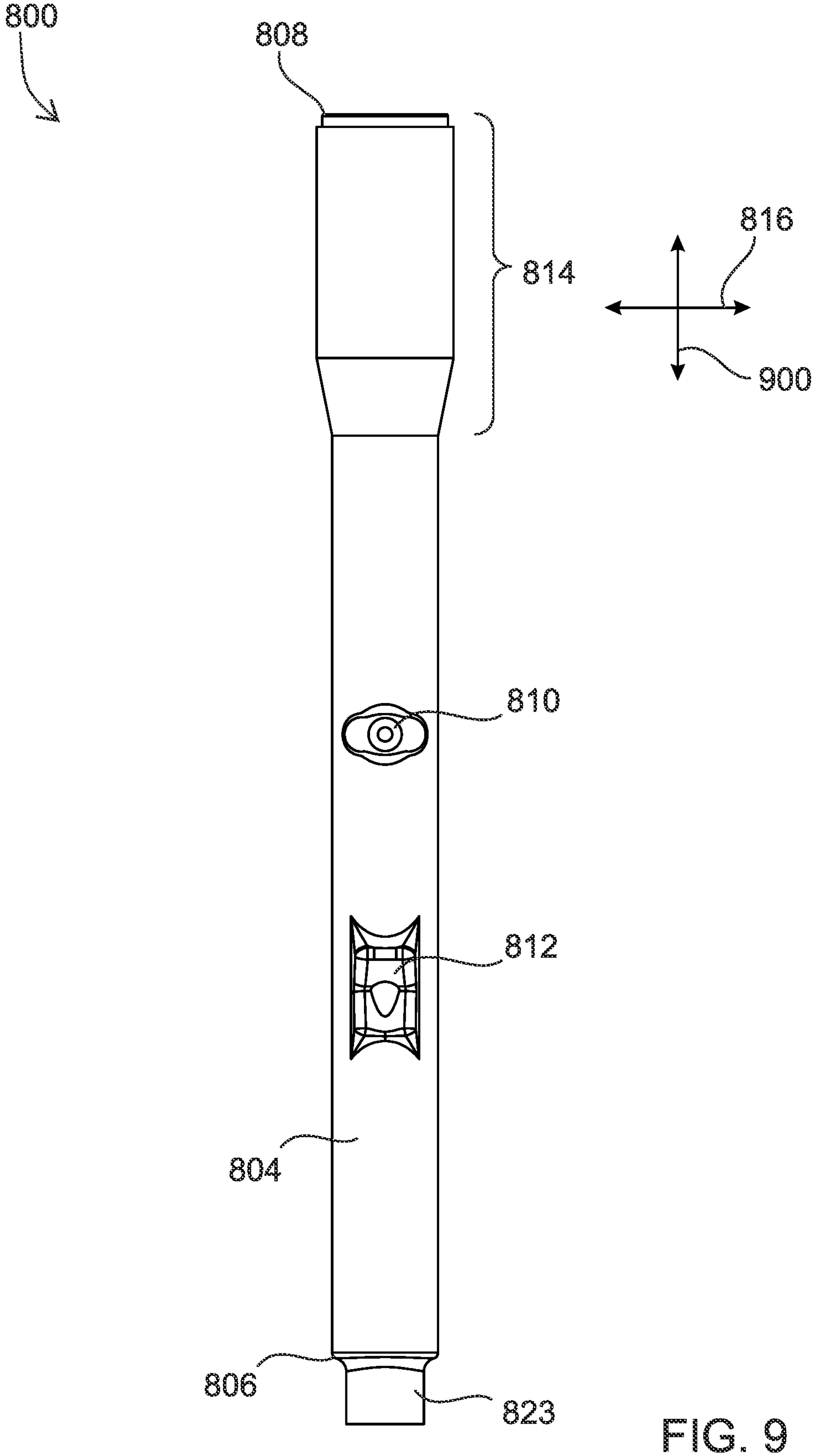
FIG. 9 is a top plan view of the handle from FIG. 8.

FIG. 9 is a top plan view of the handle from FIG. 8.FIG. 5 is a top plan view of the handle from FIG. 1. Handle 100 as illustrated in FIG. 5 is presented along a view of handle 100 from FIG. 1, along axis 118, such that axis 118 of FIG. 1 would be perpendicular to a sheet illustrating FIG. 5**.

FIG. 9 illustrates shaft 804 with end 806 proximal to cane 102 (not illustrated in FIG. 9) and end 808 distal to cane 102. Flat side 826 is not visible in FIG. 9.

Bulge 814 as illustrated in FIG. 9 may be wider than shaft 804, across axis 816. In one aspect, bulge 814 is an increase in shaft diameter along axis 816 without increasing shaft diameter along axis 818 (not illustrated in FIG. 9). Along axis 900, handle 800 may have a length of approximately 126 mm. Shaft 804 may have a diameter along axis 816 of 28 mm.

Cover 828 may wrap the entirety of handle 800 and extend beyond shaft 804 by approximately 5 mm, covering handle 800 and a portion of cane 102. Buttons 810 and 812 are illustrated in FIG. 9.

Figure 10:
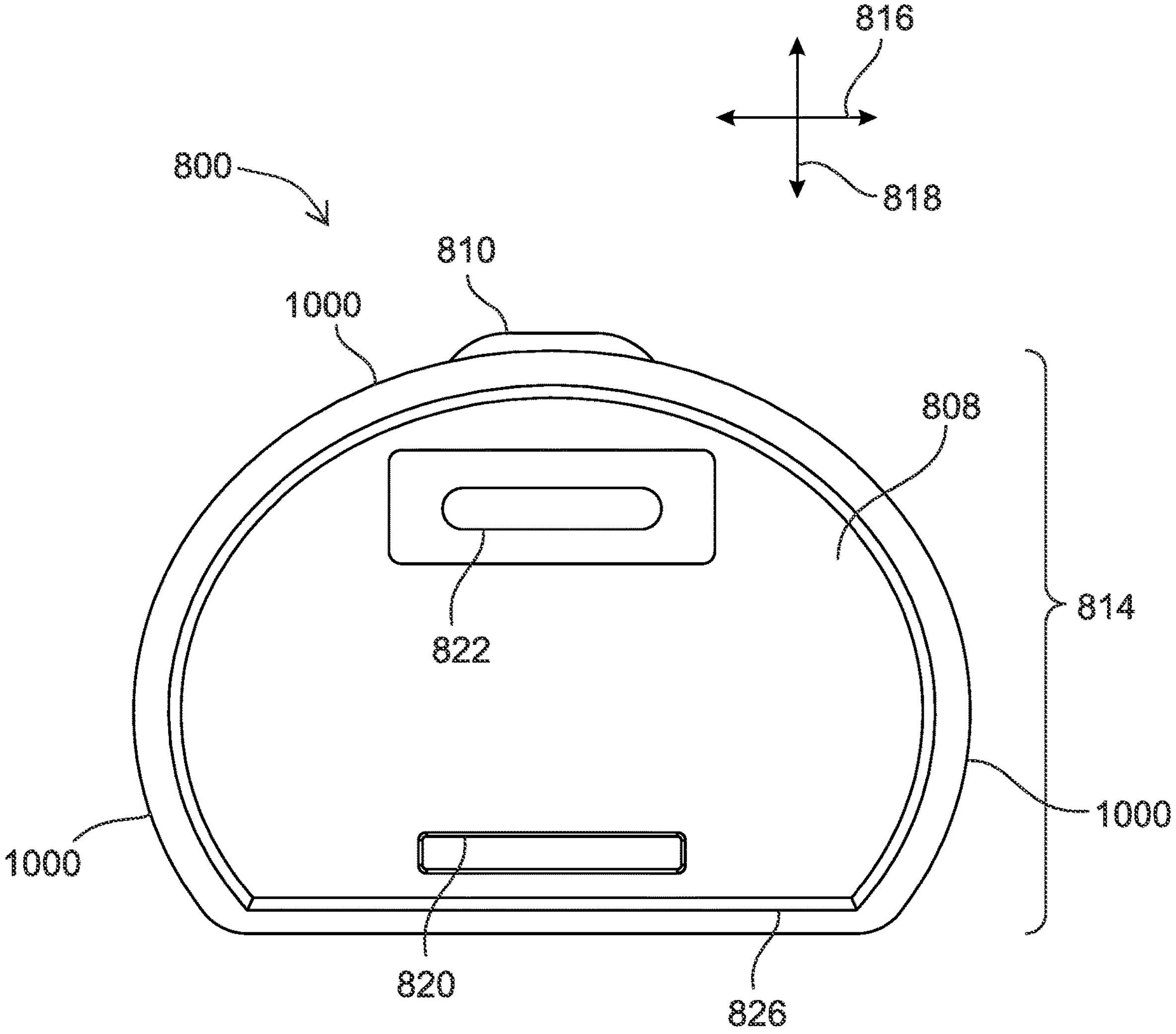
FIG. 10 is a distal plan view of the handle from FIG. 8.

FIG. 10 is a distal plan view of the handle from FIG. 8. Handle 800 as illustrated in FIG. 10 is presented along a view of handle 800 from FIG. 9, along axis 900, such that axis 900 of FIG. 9 would be perpendicular to a sheet illustrating FIG. 10.

FIG. 10 illustrates end 808 distal to cane 102 (not illustrated in FIG. 10) with end 806 proximal (not illustrated in FIG. 10) to cane 102. Flat side 126 may be connected around shaft 804 by curved sides 1000. Curved sides 1000 may be circular, elliptical, or otherwise shaped curves. Flat side 826 may have a width on axis 816 of approximately 21 mm along a portion of bulge 814. Flat side 826 may have a width on axis 816 of approximately 17 mm along shaft 804.

Bulge 814 as illustrated in FIG. 10 may be wider than shaft 804 (not illustrated in FIG. 10), across axis 816. In one aspect, bulge 814 is an increase in shaft diameter along axis 816 without increasing shaft diameter along axis 818. Slot 820, port 822 and button 810 are illustrated in FIG. 10.

Figure 11:
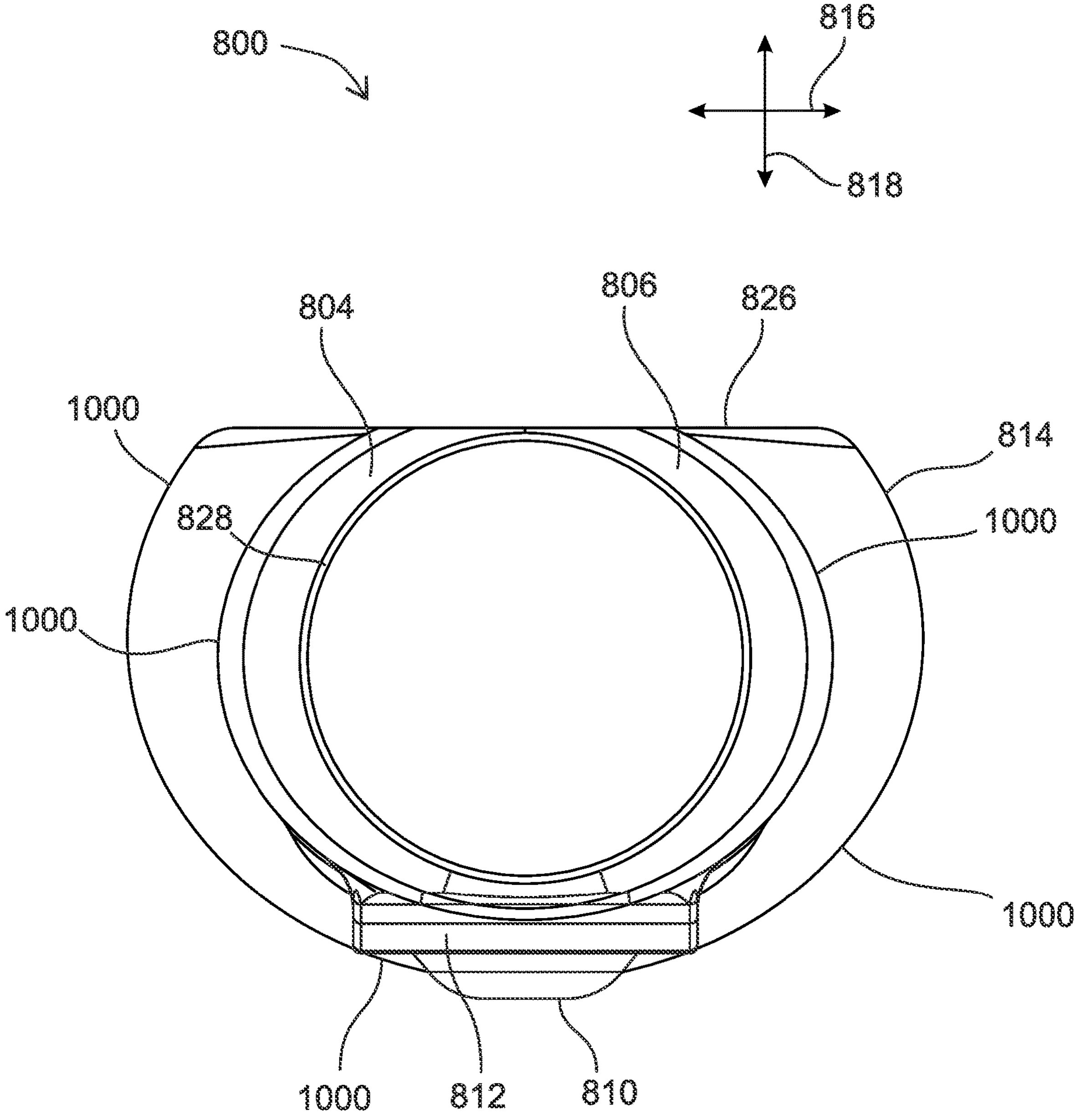
FIG. 11 is a proximal plan view of the handle from FIG. 8.

FIG. 11 is a proximal plan view of the handle from FIG. 8. Handle 800 as illustrated in FIG. 11 is presented along a view of handle 800 from FIG. 9, along axis 900, such that axis 900 of FIG. 9 would be perpendicular to a sheet illustrating FIG. 11.

FIG. 11 illustrates end 806 proximal to cane 102 (not illustrated in FIG. 11) with end 808 distal (not illustrated in FIG. 11) to cane 102. Flat side 126 may be connected on either side by curved sides 1000. Curved sides 1000 may be circular, elliptical, or otherwise shaped curves.

Bulge 814 as illustrated in FIG. 11 may be wider than shaft 804 across axis 816. In one aspect, bulge 814 is an increase in shaft diameter along axis 816 without increasing shaft diameter along axis 818. Buttons 810 and 812, and cover 828 are illustrated in FIG. 11.

Figure 12:
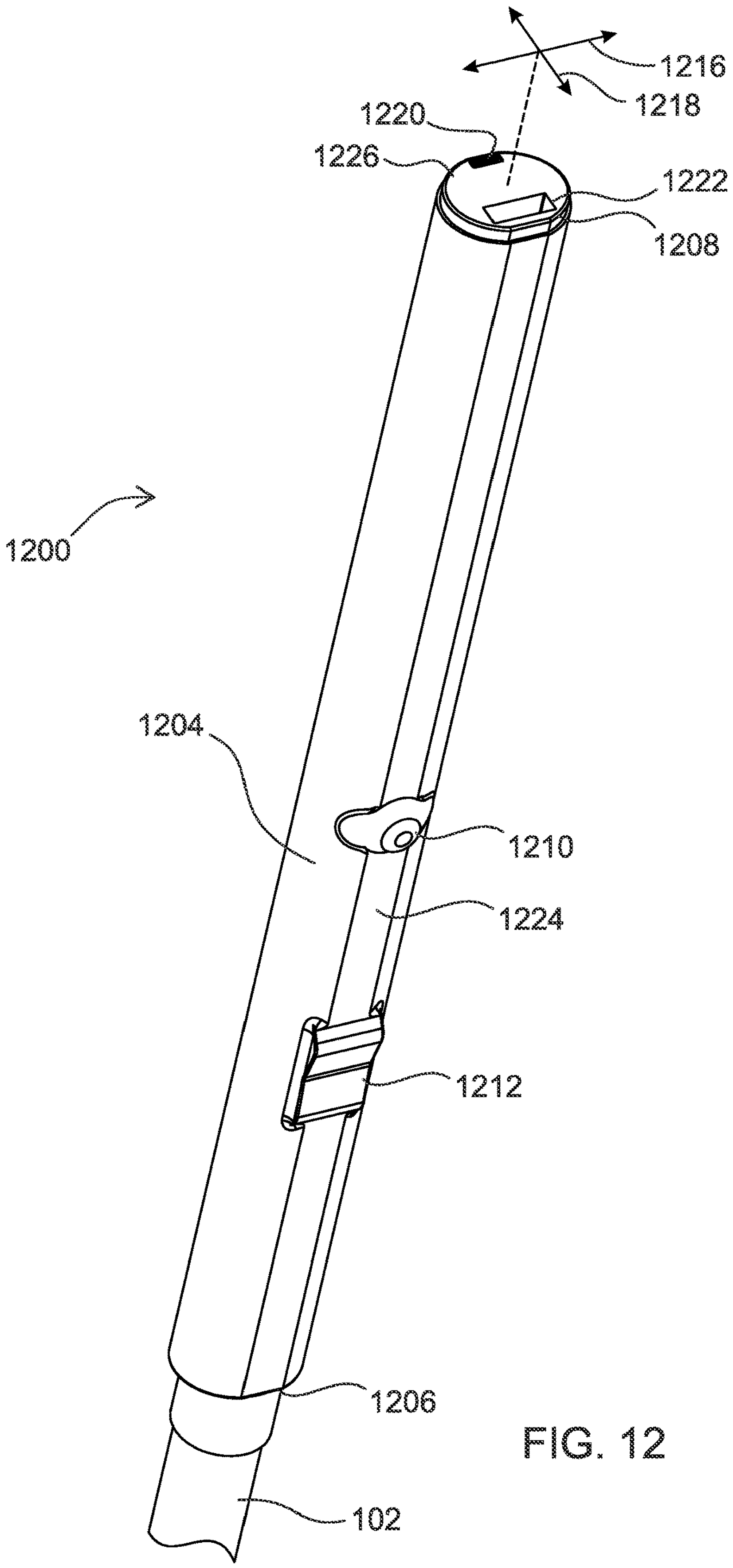
FIG. 12 is a perspective view of one handle attached to a cane.

FIG. 12 is a perspective view of one aspect of a handle attached to a cane. FIG. 12 is a perspective view of handle 1200 attached to cane 102. Cane 102 may be removably or permanently connected to handle 1200. Cane 102 may be any type of mobility cane, collapsible or fixed, probing cane, and may include illumination (either external or internal), notification technologies to make others aware of a user, or other electronics. Handle 1200 of FIG. 12 differs from handle 100 of FIG. 1 at least in that bulge 114 is absent in handle 1200.

Handle 1200 may have shaft 1204 with end 1206 proximal to cane 102 and end 1208 distal to cane 102. In one aspect, handle 1200 may contain electrical equipment (not illustrated), for example electronics, a battery, microcontroller etc. for powering a light source within cane 102 or connection, location or tracking features, wired and wireless communication. In one aspect button 1210 may be a push button or an on/off switch. In one aspect, button 1212 may be rocker switch, mode selector, or other type of actuation and may provide feedback to a user such as vibration or sound. Buttons 1210 and 1212 may be reversed in function or operation.

In one aspect, shaft 1204 may have a relatively constant shaft diameter along axis 1216 and 1218, from proximal end 1206 to distal end 1208. In one aspect, end 1208 may include slot 1220 into which a lanyard, rope, string, or other retention device (none illustrated) may be inserted or secured. Port 1222 may provide an interface to electrical equipment in handle 1200 for wired communication, charging, or both.

In one aspect, handle 1200 includes flat side 1224. Flat side 1224 may extend from proximal end 1206 to distal end 1208 and be parallel and opposite to flat side 1226, only the end of which is visible in FIG. 12. Flat sides 1224 and 1226 may be the same in width or their widths may differ. Flat side 1224 may be wider or narrower than flat side 1226. In one aspect, flat side 1224 has a width no greater than 70% the width of flat side 1226. In one aspect, flat side 1224 has a width no greater than 75% the width of flat side 1226. In one aspect, flat side 1224 has a width no greater than 80% the width of flat side 1226. In one aspect, flat side 1224 has a width no greater than 85% the width of flat side 1226. In one aspect, flat side 1224 has a width no greater than 90% the width of flat side 1226. In one aspect, flat side 1224 has a width no greater than 95% the width of flat side 1226.

Cover 1228 may wrap the entirety of handle 1200 and extend beyond shaft 1204 by approximately 4-5 mm, covering handle 1200 and a portion of cane 102. Cover 1228 may be made from a neoprene, rubber, silicon, tape or other protective material.

In one aspect, handle 1200 may have a length of approximately 126 mm, a width across axis 1218 of approximately 25 mm and a width across axis 1216 of approximately 29 mm. Flat side 1224 may have a width of 10 mm along shaft 1204.

Figure 13:
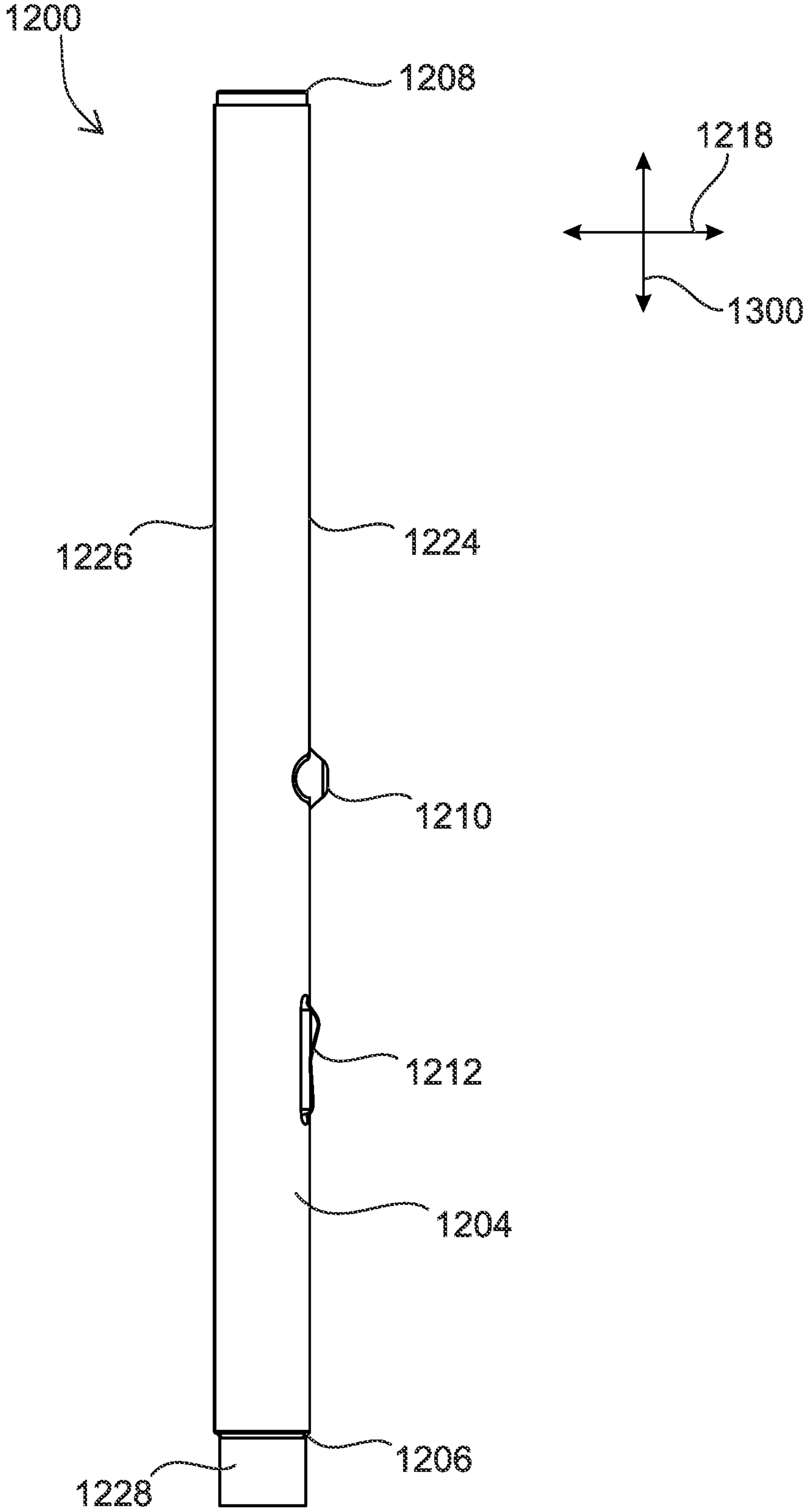
FIG. 13 is a side plan view of the handle from FIG. 12.

FIG. 13 is a side plan view of the handle from FIG. 12. Handle 1200 as illustrated in FIG. 13 is presented along a view of handle 1200 from FIG. 12, along axis 1216, such that axis 1216 of FIG. 12 would be perpendicular to a sheet illustrating FIG. 13.

FIG. 13 illustrates shaft 1204 with end 1206 proximal to cane 102 (not illustrated in FIG. 13) and end 1208 distal to cane 102. Buttons 1210 and 1212 may be positioned on flat side 1224. Flat side 1224 may be parallel and opposite to flat side 1226.

Along axis 1300, handle 1200 may have a length of approximately 126 mm. Cover 1228 may wrap the entirety of handle 1200 and extend beyond shaft 1204 by approximately 5 mm, covering handle 1200 and a portion of cane 102.

Figure 14:
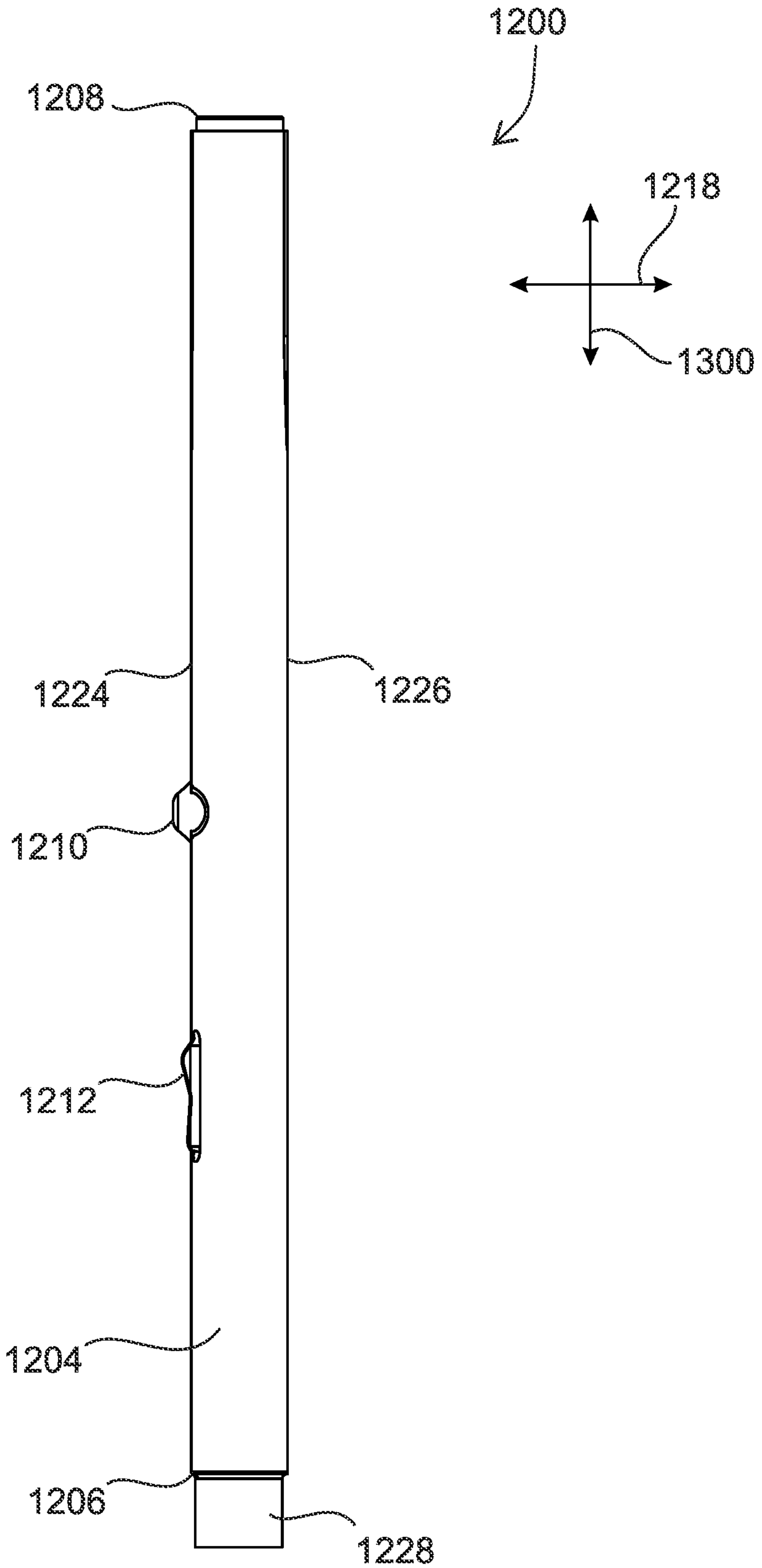
FIG. 14 is a side plan view of the handle from FIG. 12.

FIG. 14 is a side plan view of the handle from FIG. 12. Handle 1200 as illustrated in FIG. 14 is presented along a view of handle 1200 from FIG. 12, along axis 1216, such that axis 1216 of FIG. 12 would be perpendicular to a sheet illustrating FIG. 14. FIG. 14 illustrates handle 1200 from the opposite side as illustrated in FIG. 13.

FIG. 14 illustrates shaft 1204 with end 1206 proximal to cane 102 (not illustrated in FIG. 14) and end 1208 distal to cane 102. Buttons 1210 and 1212 may be positioned on flat side 1224. Flat side 1224 may be parallel and opposite to flat side 1226.

Along axis 1300, handle 100 may have a length of approximately 126 mm. Cover 128 may wrap the entirety of handle 100 and extend beyond shaft 104 by approximately 5 mm, covering handle 100 and a portion of cane 102.**

Figure 15:
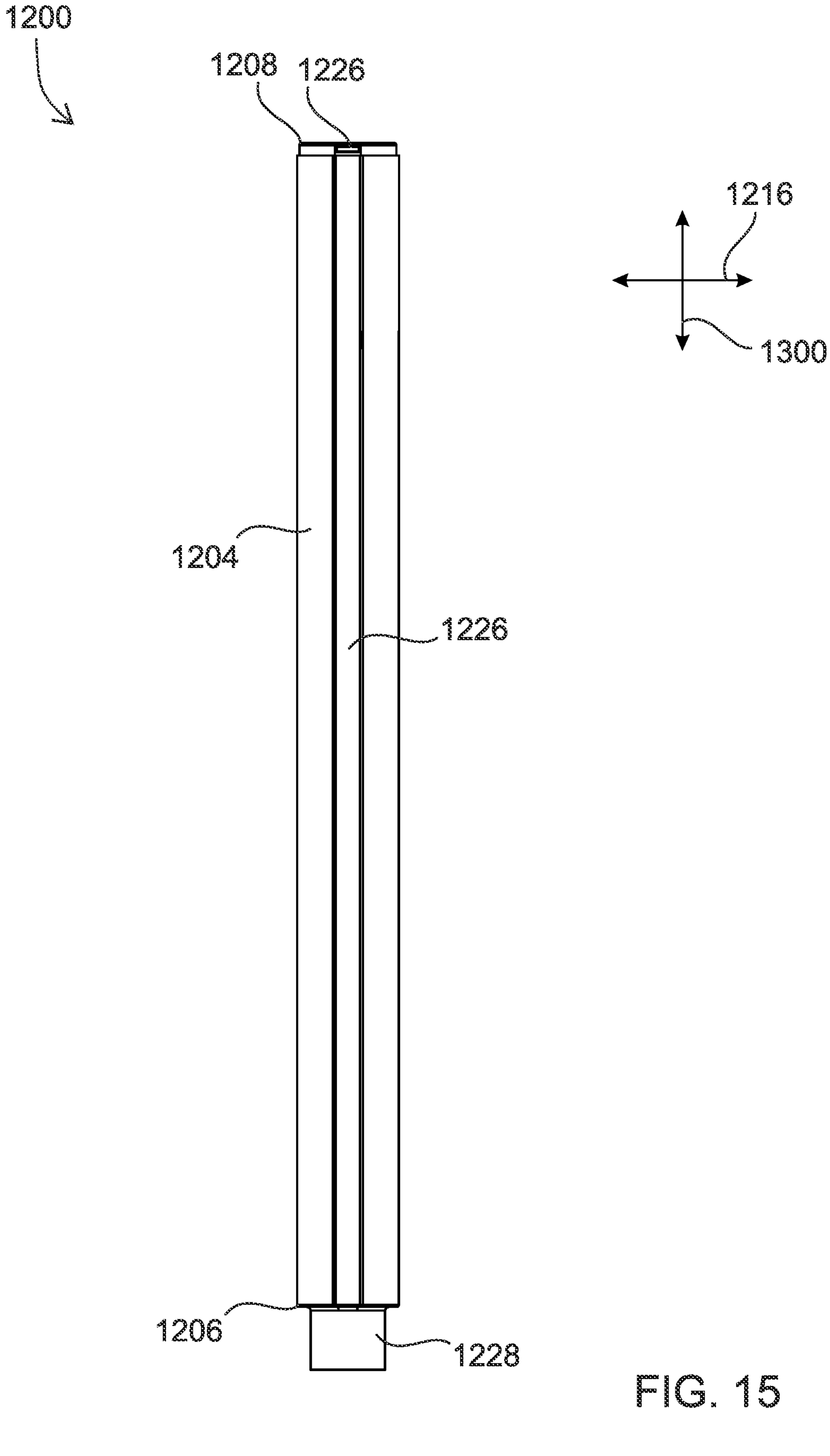
FIG. 15 is a bottom plan view of the handle from FIG. 12.

FIG. 15 is a bottom plan view of the handle from FIG. 12. Handle 1200 as illustrated in FIG. 15 is presented along a view of handle 1200 from FIG. 12, along axis 1218, such that axis 1218 of FIG. 12 would be perpendicular to a sheet illustrating FIG. 15.

FIG. 15 illustrates shaft 1204 with end 1206 proximal to cane 102 (not illustrated in FIG. 15) and end 1208 distal to cane 1202. Flat side 1226 may be parallel and opposite to flat side 1224 (not illustrated in FIG. 15).

Along axis 1300, handle 1200 may have a length of approximately 126 mm. Flat side 1226 may have a width along axis 1216 of approximately 17 mm for shaft 1204. Shaft 1204 may have a diameter along axis 1216 of 28 mm. Cover 128 may wrap the entirety of handle 1300 and extend beyond shaft 1204 by approximately 5 mm, covering handle 1200 and a portion of cane 102. Slot 1226 may be at distal end 1208.

Figure 16:
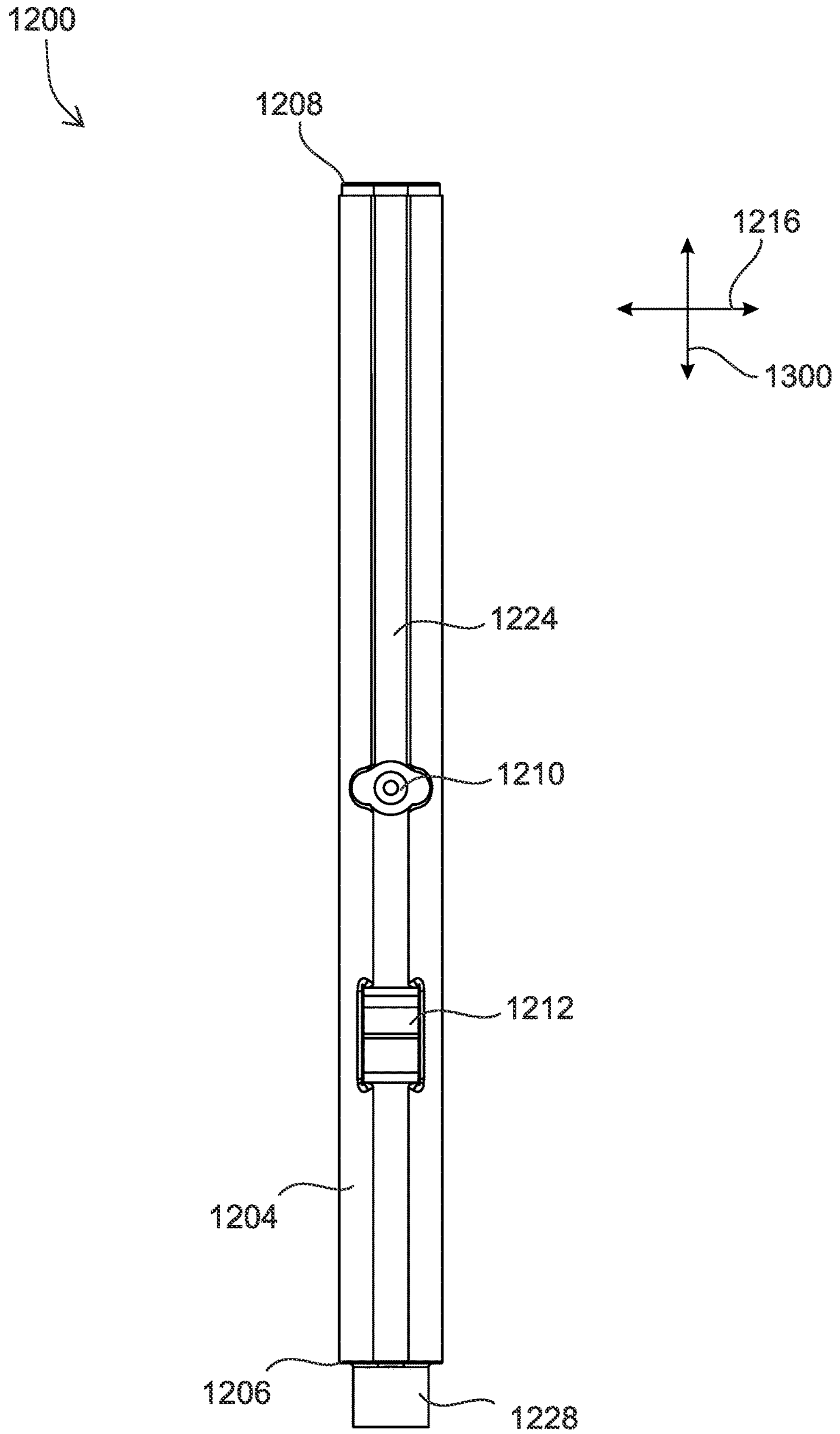
FIG. 16 is a top plan view of the handle from FIG. 12.

FIG. 16 is a top plan view of the handle from FIG. 12. Handle 1200 as illustrated in FIG. 16 is presented along a view of handle 1200 from FIG. 12, along axis 1218, such that axis 1218 of FIG. 12 would be perpendicular to a sheet illustrating FIG. 16.

FIG. 16 illustrates shaft 1204 with end 1206 proximal to cane 102 (not illustrated in FIG. 16) and end 1208 distal to cane 102. Flat side 1224 may be parallel and opposite to flat side 1226 (not illustrated in FIG. 16).

Along axis 1300, handle 1200 may have a length of approximately 126 mm. Flat side 1224 may have a width along axis 1216 of approximately 10 mm. Shaft 1204 may have a diameter along axis 1216 of 28 mm.

Cover 1228 may wrap the entirety of handle 1200 and extend beyond shaft 1204 by approximately 5 mm, covering handle 1200 and a portion of cane 102. Buttons 1210 and 1212 are illustrated in FIG. 16.

Figure 17:
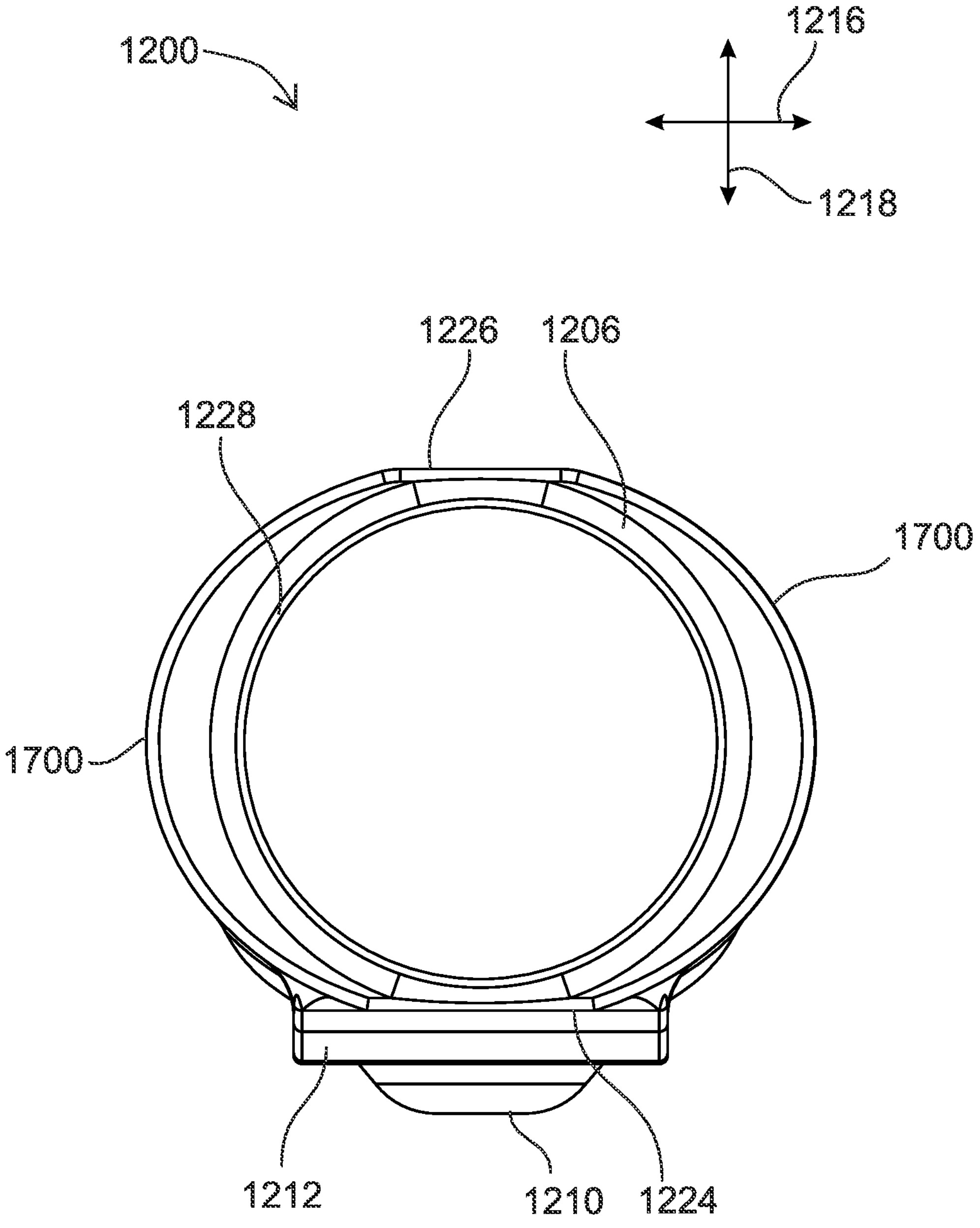
FIG. 17 is a proximal plan view of the handle from FIG. 12.

FIG. 17 is a proximal plan view of the handle from FIG. 12. Handle 1200 as illustrated in FIG. 17 is presented along a view of handle 1200 from FIGS. 14-16, along axis 1300, such that axis 1300 of FIGS. 14-16 would be perpendicular to a sheet illustrating FIG. 17.

FIG. 17 illustrates end 1206 proximal to cane 102 (not illustrated in FIG. 17) with end 1208 distal (not illustrated in FIG. 17) to cane 102. Flat side 1224 may be parallel and opposite to flat side 1226. Curved sides 1700 may connect flat sides 1224 and 1226. Curved sides 1700 may be circular, elliptical, or otherwise shaped curves. Buttons 1210 and 1212, and cover 128 are illustrated in FIG. 17.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for something" may be implemented as a "means configured to or suited for something", such as a device or a circuit configured to or suited for the respective task.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include features of a claim to any other independent claim even if this claim is not directly made dependent on the independent claim.

The invention claimed is:

1. A handle comprising:

a shaft having a proximal end and a distal end, the proximal end configured for connecting, a first side of the shaft being flat, a second side of the shaft being curved, a third side of the shaft being flat, the third side of the shaft being parallel to the first side, the third side of the shaft being narrower than the first side of the shaft, the third side connected by the first and second sides, the third side extending from the proximal end of the shaft to the distal end, the first and second sides extending from the proximal end to the distal end, the shaft having a bulge at the distal end extending from the distal end to the proximal end no more than one-third of the length of the shaft, the bulge sharing the first side and the second side of the shaft.

2. The handle of claim 1, the third side of the shaft having a width no greater than 70% the width of the first side.

3. The handle of claim 1, the width of the first side of the shaft greater in the bulge than toward the proximal end of the shaft.

4. The handle of claim 1, the second, curved side of the shaft extending around the entire circumference of the shaft except at the first, flat side of the shaft.

5. The handle of claim 4, the width of the first side of the shaft greater in the bulge than toward the proximal end of the shaft.

6. The handle of claim 5, the shaft having a constant distance between the first side and the third side, along a line perpendicular to the first side, from the proximal end to the distal end.

7. The handle of claim 6, further comprising:
electronics located within the shaft;
a charge port at the proximal end of the shaft and connected to the electronics;
a power switch connected to the electronics and suitable for activating and deactivating the electronics; and
a probing cane coupled to the shaft at the proximal end of the shaft.

8. The handle of claim 1, the width of the first side of the shaft greater in the bulge than toward the proximal end of the shaft.

9. The handle of claim 8, the width of the third side of the shaft greater in the bulge than toward the proximal end of the shaft.

10. The handle of claim 8, the shaft having a constant diameter from the proximal end to the distal end, the diameter being from the first side along a line perpendicular to the first side.

11. The handle of claim 10, further comprising:
electronics located within the shaft;
a charge port at the proximal end of the shaft and connected to the electronics; and
a power switch connected to the electronics and suitable for activating and deactivating the electronics.

12. The handle of claim 11 further comprising:
a cane for the blind coupled to the shaft at the proximal end of the shaft.

13. A handle comprising:
a shaft having a proximal end and a distal end, the proximal end configured for connecting, a first side of the shaft being flat, a second side of the shaft being flat and parallel to the first side, a third side of the shaft being curved and connecting together the first side and the second sides, the first, second and third sides extending from the proximal end to the distal end wherein the first side of the shaft is narrower than the second side.

14. The handle of claim 13 further comprising:
a fourth side of the shaft being curved, the fourth side connecting together the first side and the second side, the fourth side opposite the third side, the fourth side extending from the proximal end to the distal end.

15. The handle of claim 14, the shaft having a constant diameter from the proximal end to the distal end, the diameter being from the first side along a line perpendicular to the first side.

16. The handle of claim 15, further comprising:
electronics located within the shaft;
a charge port at the proximal end of the shaft and connected to the electronics; and
a power switch connected to the electronics and suitable for activating and deactivating the electronics.

17. The handle of claim 16 further comprising:
a probing cane coupled to the shaft at the proximal end of the shaft.

* * * * *